(12) United States Patent
Meloy et al.

(10) Patent No.: US 11,644,108 B2
(45) Date of Patent: May 9, 2023

(54) FLOW CONTROL VALVE HAVING A SEALING GASKET WITH A SECONDARY SEALING SURFACE

(71) Applicant: FISHER CONTROLS INTERNATIONAL LLC, Marshalltown, IA (US)

(72) Inventors: Robert M. Meloy, Marshalltown, IA (US); Jeffrey Michael Von Arb, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 375 days.

(21) Appl. No.: 16/557,170

(22) Filed: Aug. 30, 2019

(65) Prior Publication Data
US 2021/0062922 A1 Mar. 4, 2021

(51) Int. Cl.
*F16K 5/06* (2006.01)
*F16K 27/06* (2006.01)
*F16J 15/08* (2006.01)
*F16J 15/12* (2006.01)

(52) U.S. Cl.
CPC .................. *F16K 5/0689* (2013.01)

(58) Field of Classification Search
CPC .... F16K 5/0689; F16K 5/0663; F16K 27/067; F16K 5/0642; F16J 15/121; F16J 15/022; F16L 19/0212–0218; F16L 19/12; F16L 23/18
See application file for complete search history.

(56) References Cited

U.S. PATENT DOCUMENTS

| | | | | |
|---|---|---|---|---|
| 2,900,199 A | * | 8/1959 | Logan .................... | F16L 23/18 277/614 |
| 3,501,158 A | * | 3/1970 | Tillman .................. | F16L 23/18 277/614 |
| 3,990,712 A | * | 11/1976 | Dechavanne ............ | F16J 15/32 277/468 |
| 4,470,609 A | * | 9/1984 | Poe ......................... | F16L 23/18 277/623 |

(Continued)

OTHER PUBLICATIONS

Emerson, "Z500 Valve Instruction Manual", dated Jul. 2018, 20 pgs.

(Continued)

*Primary Examiner* — Marina A Tietjen
(74) *Attorney, Agent, or Firm* — Marshall, Gerstein & Borun LLP

(57) ABSTRACT

A flow control valve includes a valve body having a first section and a second section attached to the first section. A flow control member is positioned within the valve body and a shaft extends through the valve body and is connected to the flow control member to move the flow control member between an open position and a closed position. A sealing gasket is positioned within the valve body and engages the valve body to prevent the flow of fluid between the first section and the second section. The sealing gasket has an annular metallic body having an inner surface and an opposing outer surface, the outer surface defining a primary sealing surface, a groove formed in the outer surface, and an insert positioned within the groove, the insert defining a secondary sealing surface.

14 Claims, 5 Drawing Sheets

(56) References Cited

U.S. PATENT DOCUMENTS

| | | | | |
|---|---|---|---|---|
| 4,930,791 A | * | 6/1990 | Ungchusri | F16J 15/3256 |
| | | | | 277/607 |
| 5,135,266 A | * | 8/1992 | Bridges | E21B 33/0422 |
| | | | | 285/123.12 |
| 5,944,319 A | * | 8/1999 | Kohlman | F16L 23/18 |
| | | | | 277/626 |
| 6,237,968 B1 | * | 5/2001 | Bohnes | F16L 19/0283 |
| | | | | 285/334.2 |
| 6,325,390 B1 | * | 12/2001 | Sillmon | F16L 23/003 |
| | | | | 277/614 |
| 6,899,358 B2 | * | 5/2005 | Richardson | F16L 19/0212 |
| | | | | 285/354 |
| 6,932,355 B1 | * | 8/2005 | Hjertholm | F16L 23/18 |
| | | | | 277/614 |
| 9,534,689 B2 | * | 1/2017 | Chen | F16J 15/08 |
| 10,393,294 B2 | * | 8/2019 | Ungchusri | F16L 19/0231 |
| 2007/0013146 A1 | * | 1/2007 | Gariepy | F16L 25/0018 |
| | | | | 277/608 |
| 2009/0102132 A1 | * | 4/2009 | Holliday | E21B 33/035 |
| | | | | 277/324 |
| 2011/0140025 A1 | * | 6/2011 | Beasley | F16K 5/0668 |
| | | | | 251/315.16 |
| 2016/0153596 A1 | * | 6/2016 | Ungchusri | F16J 15/121 |
| | | | | 285/93 |

OTHER PUBLICATIONS

Emerson, "Z500 Ball Valves Product Bulletin", dated Jan. 2019, 32 pgs.

* cited by examiner

FLOW CONTROL VALVE HAVING A SEALING GASKET WITH A SECONDARY SEALING SURFACE

FIELD OF THE INVENTION

This disclosure relates generally to flow control valves and, more particularly, to flow control valves having metallic sealing gaskets.

BACKGROUND

Process control systems often employ flow control valves, such as ball valves, butterfly valves, eccentric-disk valves, eccentric-plug valves, etc., to control the flow of process fluids. Flow control valves typically include a valve trim assembly having a valve seat, disposed in the fluid path and surrounding a flow aperture, and a flow control member (e.g., a ball, a disk, etc.) disposed in the fluid path. A shaft operatively couples the flow control member to an actuation device to rotate or move the flow control member between an open position and a closed position, thereby selectively allowing or restricting fluid flow between an inlet and an outlet of the flow control valve.

In some cases, a flow control valve may be employed in applications (e.g., high pressure steam, lethal fluids, fugitive emissions (refining/oil and gas), etc.) and/or be required to pass certification tests (e.g., Shell MESC 77/300, ISO15848-1, API6D Annex H, etc.) where very low leakage (or none at all) between various valve or valve body parts is required. However, standard flow control valves typically use metal ring gaskets between valve or valve body parts, which can have problems minimizing leakage due to thermal expansion/contraction, surface imperfections, damage/wear, etc., in certain conditions, such as in high temperature or pressure applications.

SUMMARY

In accordance with one exemplary aspect of the present invention, a flow control valve comprises a valve body having a first section and a second section attached to the first section. A flow control member is positioned within the valve body and a shaft extends through the valve body and is connected to the flow control member to move the flow control member between an open position and a closed position. A sealing gasket is positioned within the valve body and engages the valve body to prevent the flow of fluid between the first section and the second section. The sealing gasket has an annular metallic body having an inner surface and an opposing outer surface, the outer surface defining a primary sealing surface, a groove formed in the outer surface, and an insert positioned within the groove, the insert defining a secondary sealing surface.

In further accordance with any one or more of the foregoing exemplary aspects of the present invention, the flow control valve may further include, in any combination, any one or more of the following preferred forms.

In one preferred form, the second section of the valve body is an end adapter.

In another preferred form, the flow control valve is a ball valve.

In another preferred form, the secondary sealing surface engages the first portion and the second portion of the valve body.

In another preferred form, the insert is graphite.

In another preferred form, the insert is a graphite laminate.

In another preferred form, the insert is a polymer.

In another preferred form, the sealing gasket comprises a plurality of grooves formed in the outer surface of the annular metallic body and a plurality of inserts, each insert positioned within a corresponding one of the plurality of grooves.

In another preferred form, the outer surface of the sealing gasket comprises a first portion and a second portion, non-parallel to the first portion. The groove is formed in the first portion and a second groove is formed in the second portion. A second insert is positioned in the second groove to provide a second secondary sealing surface. The secondary sealing surface engages the first section of the valve body and the second secondary sealing surface engages the second section of the valve body.

In accordance with another exemplary aspect of the present invention, a sealing gasket for a flow control valve comprises an annular metallic body having an inner surface and an opposing outer surface, the outer surface defining a primary sealing surface. A groove is formed in the outer surface and an insert positioned within the groove, the insert defining a secondary sealing surface.

In further accordance with any one or more of the foregoing exemplary aspects of the present invention, the sealing gasket may further include, in any combination, any one or more of the following preferred forms.

In one preferred form, the insert is graphite.

In another preferred form, the insert is a graphite laminate.

In another preferred form, the insert is a polymer.

In another preferred form, the sealing gasket comprises a plurality of grooves formed in the outer surface of the annular metallic body and a plurality of inserts, each insert positioned within a corresponding one of the plurality of grooves.

In another preferred form, the outer surface comprises a first portion and a second portion, non-parallel to the first portion. The groove is formed in the first portion, a second groove is formed in the second portion, and a second insert is positioned in the second groove to provide a second secondary sealing surface.

In another preferred form, the flow control valve is a ball valve.

In accordance with another exemplary aspect of the present invention, a sealing gasket for a flow control valve comprises an annular metallic body having an inner surface and an opposing outer surface, the outer surface defining a primary sealing surface, and a means for providing a secondary sealing surface on the outer surface of the annular metallic body.

In further accordance with any one or more of the foregoing exemplary aspects of the present invention, the sealing gasket may further include, in any combination, any one or more of the following preferred forms.

In one preferred form, the sealing gasket comprises a means for providing a second secondary sealing surface on the outer surface of the annular metallic body.

In another preferred form, the outer surface of the annular metallic body comprises a first portion and a second portion, non-parallel to the first portion. The means for providing a secondary sealing surface is positioned on the first portion and the means for providing a second secondary sealing surface is positioned on the second portion.

In another preferred form, the means for providing a secondary sealing surface is configured to engage a first section of a valve body of the control valve and the means for providing a second secondary sealing surface is configured to engage a second section of the valve body.

DETAILED DESCRIPTION

The present disclosure is directed to a flow control valve with a sealing gasket having one or more inserts with a hardness less than that of the metallic body of the sealing gasket that provide one or more secondary sealing surfaces, in addition to the primary sealing surface provided by the outer surface of the metallic body. The secondary sealing surface(s) can be used to improve sealing between various valve or valve body parts under low leakage requirement or certification test situations, aggressive services, or in circumstances where the valve or valve body parts may be worn, damaged, or imperfect.

Figure 1:
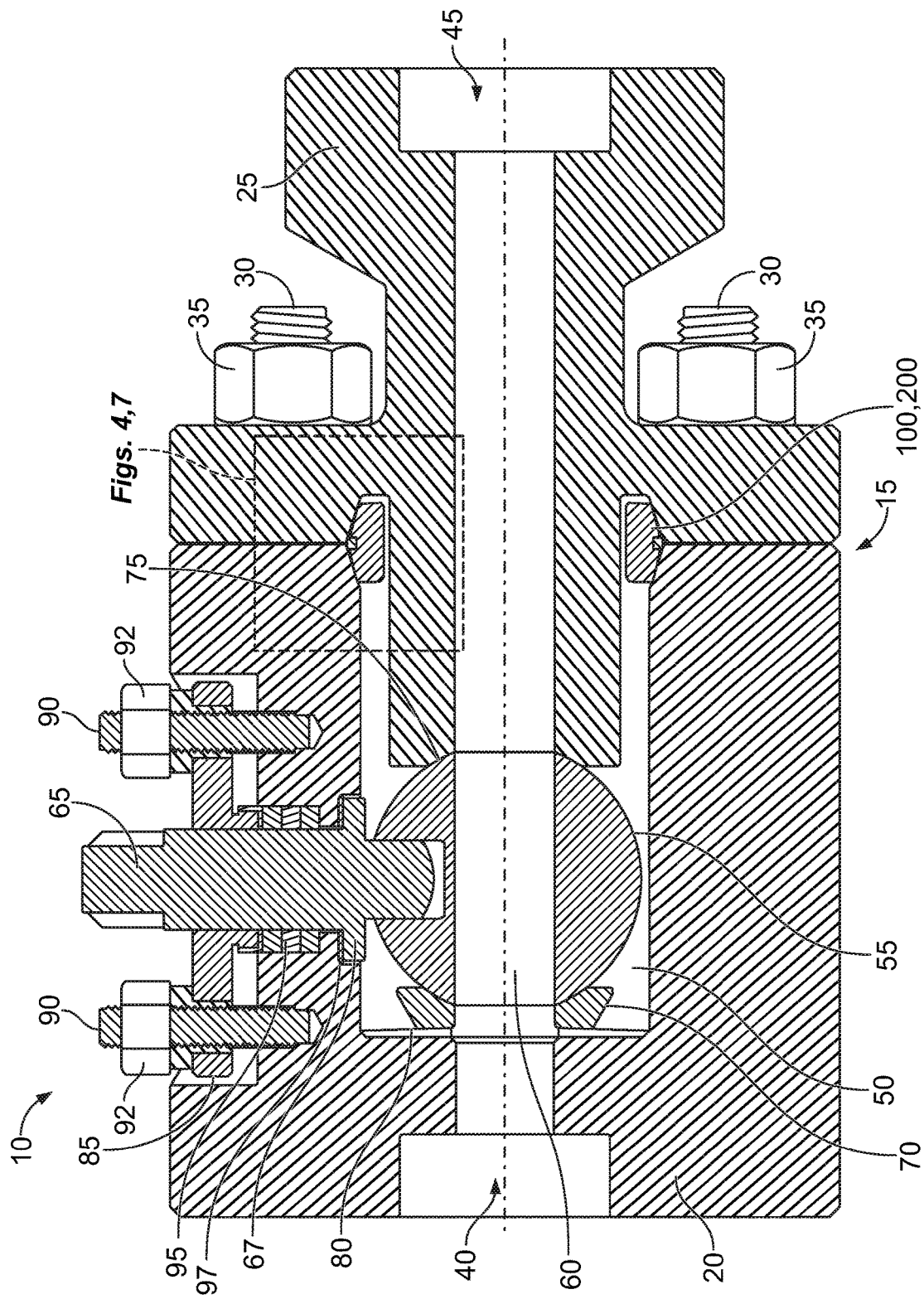
FIG. 1 is an illustration of an example flow control valve.

Referring to FIG. 1, an example flow control valve 10, such as the Fisher™ Z500 Severe Service Ball Valve, generally includes a valve body 15 including a first section 20 (main body) defining an inlet 40 and a second section 25 (end adapter) defining an outlet 45 and attached to first section 20 via threaded members 30 and nuts 35. A cavity 50 is formed in valve body 15 between inlet 40 and outlet 45 and a flow control member 55, which in the example shown is a ball of a ball valve, is positioned and rotatable within cavity 50 of valve body 15. An upstream valve seat 70 is positioned within cavity 50 between inlet 40 and flow control member 55 and is biased to engage flow control member 55 by a spring 80 to prevent fluid leakage between upstream valve seat 70 and flow control member 55. Second section 25 of valve body 15 also defines a downstream valve seat 75, which engages flow control member 55 proximate outlet 45, opposite upstream valve seat 70.

A shaft 65 is connected to flow control member 55 to move flow control member 55 between an open position, in which a bore 60 through flow control member 55 is aligned or partially aligned with inlet 40 and outlet 45 and allows the flow of fluid through flow control valve 10, and a closed position, in which bore 60 is not aligned with inlet 40 and/or outlet 45 and does not allow the flow of fluid through flow control valve 10. Shaft 65 is also coupled to an actuator (now shown) that provides an actuating force to selectively rotate flow control member 55 and extends through first section 20 of valve body 15 with packing 95 positioned between shaft 65 and valve body 15 to prevent the fluid leakage between shaft 65 and valve body 15. Packing 95 is compressed and held in place by gland plate 85, which is secured to first section 20 of valve body 15 by threaded members 90 and nuts 92. A thrust washer 97 can also be positioned between first section 20 of valve body 15 and a flange 67 of shaft 65 to bias shaft 65 towards flow control member 55.

A sealing gasket 100 (FIG. 2-4) or 200 (FIGS. 5-7) is positioned within cavity 50 of valve body 15 and engages first section 20 and second section 25 of valve body 15 to prevent leakage and the flow of fluid between first section 20 and second section 25. Although sealing gasket 100, 200 is show herein engaging and preventing leakage and fluid flow between two parts of the valve body, sealing gasket 100, 200 can be used anywhere in flow control valve 10 to prevent leakage and fluid flow between any two metallic parts or at the joint between any two metallic parts.

Figure 2:
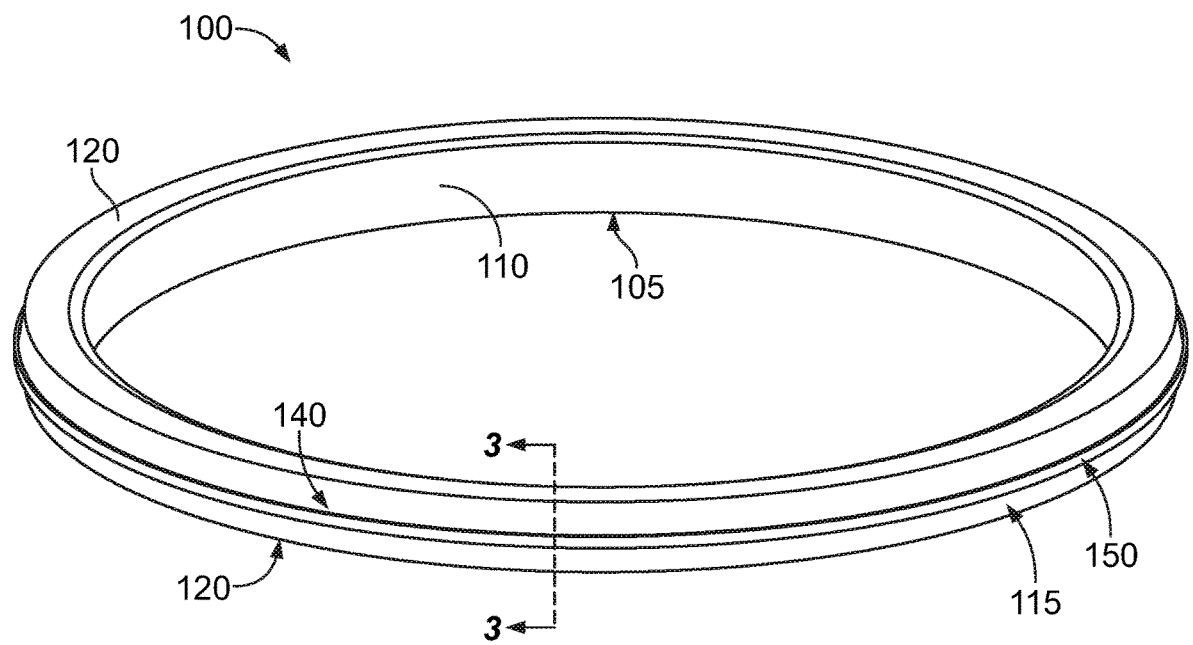
FIG. 2 is an illustration of an example sealing gasket of the flow control valve of FIG. 1.
Figure 3:
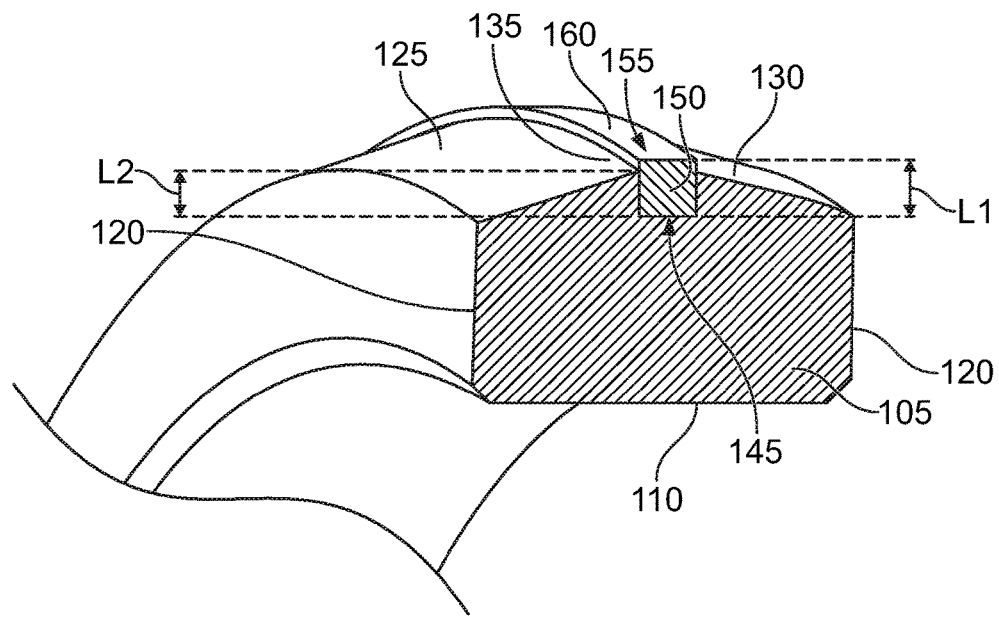
FIG. 3 is a cross-sectional view of a portion of the sealing gasket of FIG. 2 taken along line 3-3 of FIG. 2.
Figure 4:
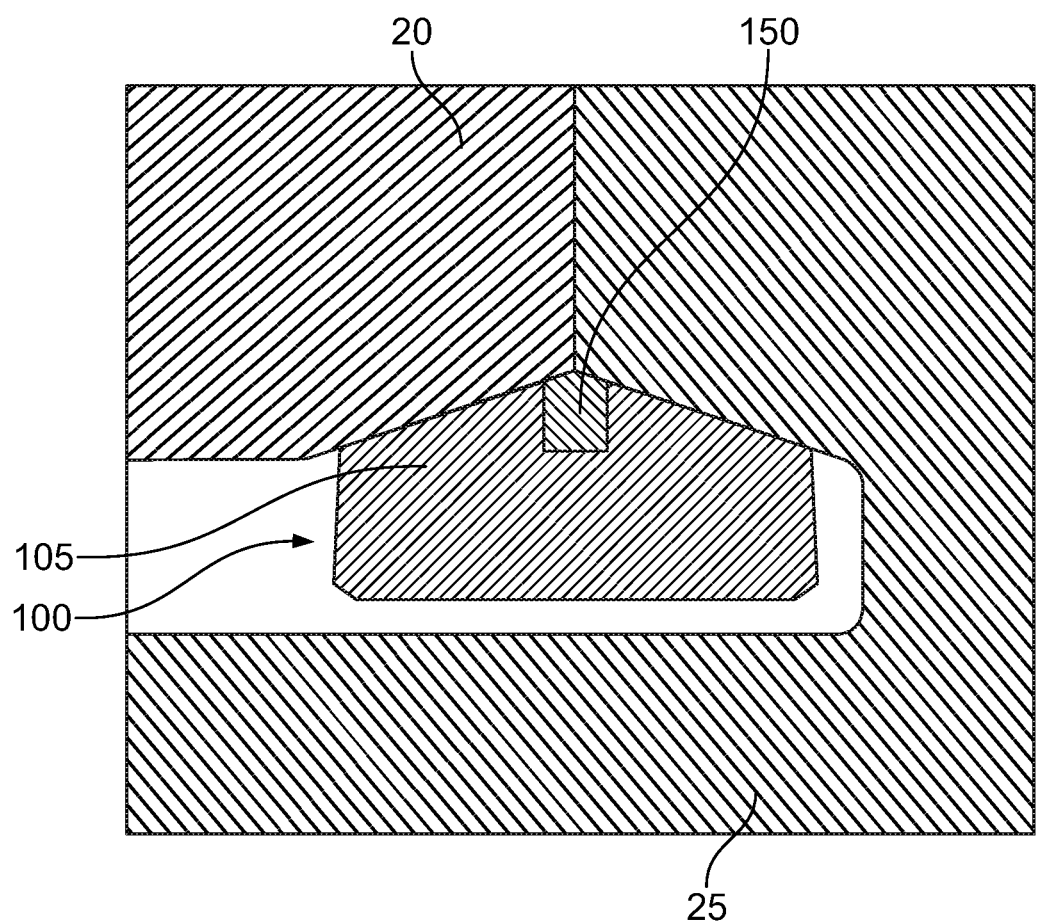
FIG. 4 is an enlarged view of a portion of the flow control valve of FIG. 1 showing the sealing gasket of FIG. 2 installed.

Referring to FIGS. 2-4, a first example sealing gasket 100 has an annular metallic body 105 with an inner surface 110, an opposing outer surface 115, and side surfaces 120 interconnecting the inner surface 110 and outer surface 115. In the example shown, outer surface 115 has first, second, and third portions 125, 130, 135 and defines a primary sealing surface 140 that engages first section 20 and second section 25 of valve body 15 and provide a metal-to-metal seal to prevent or minimize leakage or fluid flow between first section 20 and second section 25. Alternatively, rather than having the generally trapezoidal shape shown in FIGS. 2-4, with a multi-portion outer surface, annular metallic body 105 can have any cross-sectional shape desired that would be appropriate for a particular application. A groove 145 is formed in outer surface 115, specifically in third portion 135 in the example shown, and an insert 150 is positioned within groove 145. An outer surface 155 of insert 150 defines a secondary sealing surface 160, which also engages both first section 20 and second section 25 of valve body 15 to assist the metal-to-metal seal of primary sealing surface 140 in preventing or mitigating leakage or the flow of fluid between first section 20 and second section 25. Insert 150 can be made of solid graphite, a graphite composite, or a graphite laminate (e.g., graphite with metallic reinforcement) and has an uncompressed radial length L1 that is slightly larger than a radial length L2 of groove 145 such that outer surface 155 of insert 150 is outwardly radially offset from outer surface 115 of body 105 (FIG. 3) when sealing gasket 100 is initially assembled and insert 150 is compressed and outer surface 155 is coplanar with outer surface 115 of body 105 (FIG. 4) when sealing gasket 100 is installed in flow control valve 10. The use graphite, graphite composite, or graphite laminate for insert 150 gives insert 150 the ability to rebound with changes (e.g., thermal, physical, etc.) in outer surface 155 an can provide a more effective seal with first section 20 and second section 25 of valve body 15 than the metal-to-metal seal of outer surface 115 of body 105 against imperfect surfaces (e.g., scratches, dents, oxidation, etc.). Alternatively, insert 150 could also be made of a polymer, such as an elastomer, if flow control valve 10 is being used in a low temperature application.

Figure 5:
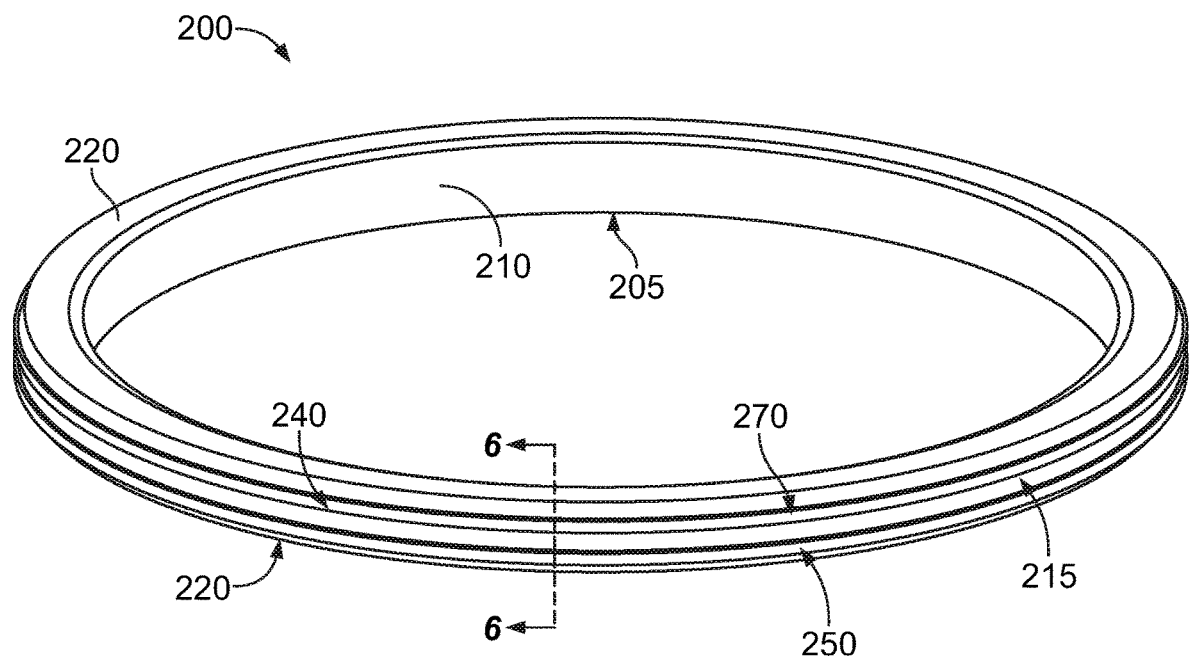
FIG. 5 is an illustration of an alternative example sealing gasket that can be used in the flow control valve of FIG. 1.
Figure 6:
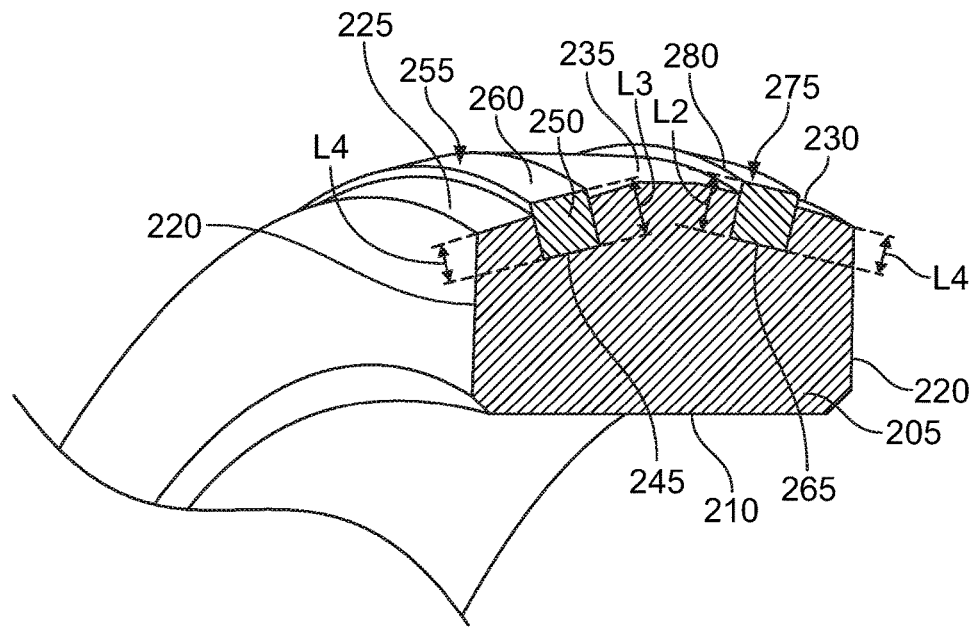
FIG. 6 is a cross-sectional view of a portion of the sealing gasket of FIG. 5 taken along line 6-6 of FIG. 5.
Figure 7:
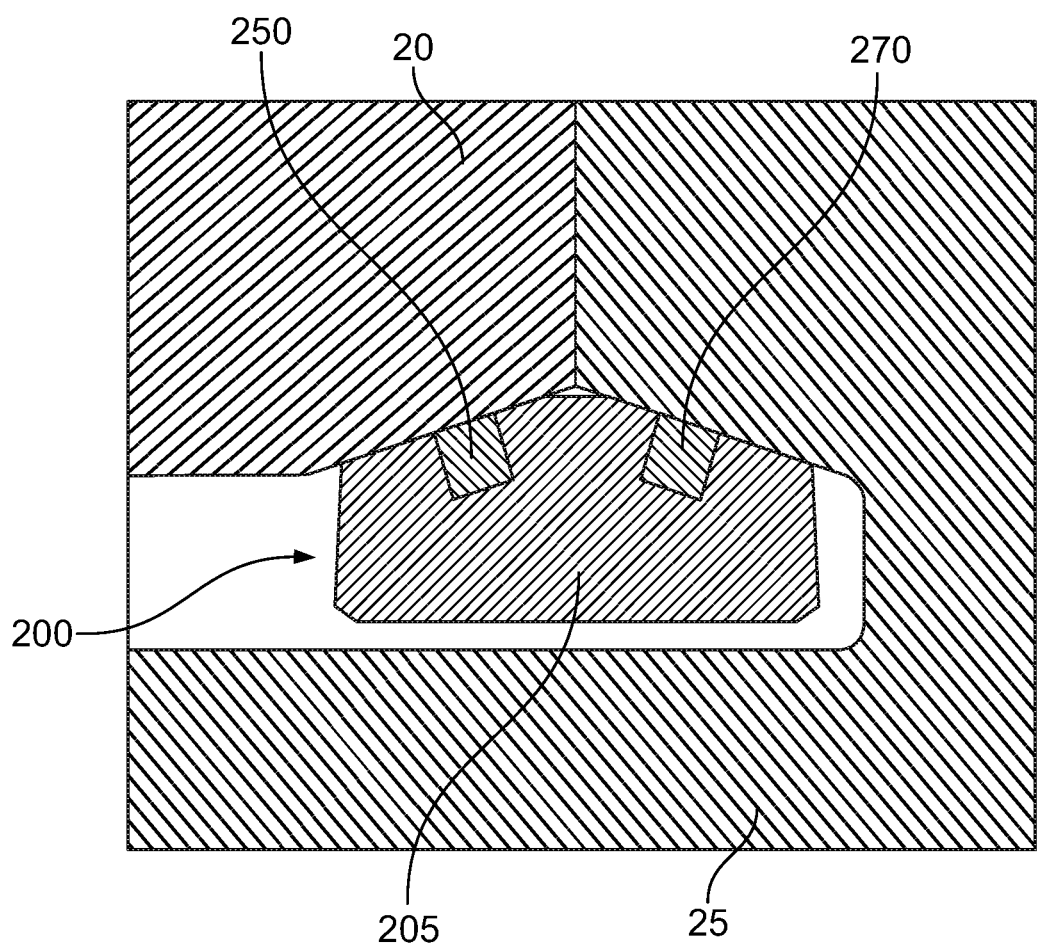
FIG. 7 is an enlarged view of a portion of the flow control valve of FIG. 1 showing the alternative sealing gasket of FIG. 5 installed.

Referring to FIGS. 5-7, a second example sealing gasket 200 has an annular metallic body 205 with an inner surface 210, an opposing outer surface 215, and side surfaces 220 interconnecting the inner surface 210 and outer surface 215. In the example shown, outer surface 215 has first, second, and third portions 225, 230, 235 and defines a primary sealing surface 240 that engages first section 20 and second section 25 of valve body 15 and provide a metal-to-metal seal to prevent or minimize leakage or fluid flow between first section 20 and second section 25. Alternatively, rather than having the generally trapezoidal shape shown in FIGS. 5-7, with a multi-portion outer surface, annular metallic body 205 can have any cross-sectional shape desired that would be appropriate for a particular application. A groove 245 is formed in outer surface 215, specifically in first portion 225 in the example shown, and an insert 250 is positioned within groove 245. An outer surface 255 of insert 250 defines a secondary sealing surface 260, which engages first section 20 of valve body 15 to assist the metal-to-metal seal of primary sealing surface 240 in preventing or mitigating leakage or the flow of fluid between first section 20 and second section 25. A second groove 265 is also formed in outer surface 215, specifically in second portion 230 in the example shown, and a second insert 270 is positioned within second groove 265. An outer surface 275 of second insert 270 defines a second secondary sealing surface 280, which engages second section 25 of valve body 15 to assist the metal-to-metal seal of primary sealing surface 240 in preventing or mitigating leakage or the flow of fluid between first section and second section 25. While two grooves 245, 265 and two inserts 250, 270 are shown in the example above, any number of grooves and inserts can be used as would be appropriate for the particular application to provide any number of desired secondary sealing surfaces.

Inserts 250, 270 can be made of solid graphite, a graphite composite, or a graphite laminate (e.g., graphite with metallic reinforcement) and have an uncompressed radial length L3 that is slightly larger than a radial length L4 of groove 245 and second groove 265 such that outer surfaces 255, 275 of inserts 250, 270 are outwardly radially offset from outer surface 215 of body 205 (FIG. 3) when sealing gasket 200 is initially assembled and inserts 250, 270 are compressed and outer surfaces 255, 275 are coplanar with outer surface 215 of body 205 (FIG. 7) when sealing gasket 200 is installed in flow control valve 10. The use graphite, graphite composite, or graphite laminate for inserts 250, 270 gives inserts 250, 270 the ability to rebound with changes (e.g., thermal, physical, etc.) in outer surface 255, 275 an can provide a more effective seal with first section 20 and second section 25 of valve body 15 than the metal-to-metal seal of outer surface 215 of body 205 against imperfect surfaces (e.g., scratches, dents, oxidation, etc.). Alternatively, inserts 250, 270 could also be made of a polymer, such as an elastomer, if flow control valve 10 is being used in a low temperature application.

While various embodiments have been described above, this disclosure is not intended to be limited thereto. Variations can be made to the disclosed embodiments that are still within the scope of the appended claims.

What is claimed is:

1. A flow control valve, comprising:
a valve body having a first section including a first valve seat and a second section attached to the first section and including a second valve seat;
a flow control member positioned within the valve body;
a shaft extending through the valve body and connected to the flow control member to move the flow control member between an open position and a closed position; and
a sealing gasket positioned within the valve body and engaging the valve body to prevent fluid flow between the first section and the second section, the sealing gasket including:
an annular metallic body having an inner surface and an opposing outer surface, the outer surface defining a primary sealing surface that provides a metal-to-metal seal to prevent fluid flow between the outer surface and the valve body;
a groove formed in the outer surface; and
an insert positioned within the groove, the insert defining a secondary sealing surface, the secondary sealing surface positioned on the insert to engage both the first section and the second section of the valve body.

2. The flow control valve of claim 1, wherein the second section of the valve body is an end adapter.

3. The flow control valve of claim 1, wherein the flow control valve is a ball valve.

4. The flow control valve of claim 1, wherein the secondary sealing surface engages the first section and the second section of the valve body.

5. The flow control valve of claim 1, wherein the insert is graphite.

6. The flow control valve of claim 1, wherein the insert is a graphite laminate.

7. The flow control valve of claim 1, wherein the insert is a polymer.

8. The flow control valve of claim 1, comprising a plurality of grooves formed in the outer surface of the annular metallic body and a plurality of inserts, each insert positioned within a corresponding one of the plurality of grooves.

9. The flow control valve of claim 1, wherein:
the outer surface of the sealing gasket comprises a first portion and a second portion, non-parallel to the first portion;
the groove is formed in the first portion;
a second groove is formed in the second portion and a second insert is positioned in the second groove to provide a second secondary sealing surface;
the secondary sealing surface engages the first section of the valve body; and
the second secondary sealing surface engages the second section of the valve body.

10. A sealing gasket for a flow control valve, comprising:
an annular metallic body having an inner surface and an opposing outer surface, the outer surface defining a primary sealing surface and comprising a first portion and a second portion, non-parallel to the first portion;
a groove formed in the outer surface between the first portion and the second portion; and
an insert positioned within the groove between the first portion and the second portion, the insert defining a secondary sealing surface; and
further wherein the secondary sealing surface is positioned on the insert to engage both a first section and a second section of a valve body.

11. The sealing gasket of claim 10, wherein the insert is graphite.

12. The sealing gasket of claim 10, wherein the insert is a graphite laminate.

13. The sealing gasket of claim 10, wherein the insert is a polymer.

14. The sealing gasket of claim 10, wherein the flow control valve is a ball valve.

* * * * *

UNITED STATES PATENT AND TRADEMARK OFFICE
CERTIFICATE OF CORRECTION

PATENT NO. : 11,644,108 B2  
APPLICATION NO. : 16/557170  
DATED : May 9, 2023  
INVENTOR(S) : Robert M. Meloy et al.

Page 1 of 1

It is certified that error appears in the above-identified patent and that said Letters Patent is hereby corrected as shown below:

In the Specification

At Column 4, Line 4, "(FIG. 2-4)" should be -- (FIGS. 2-4) --.

At Column 4, Line 9, "show" should be -- shown --.

At Column 4, Line 45, "use graphite," should be -- use of graphite, --.

At Column 4, Line 47, "155 an" should be -- 155 and --.

At Column 5, Line 32, "use graphite," should be -- use of graphite, --.

At Column 5, Line 35, "an can" should be -- and can --.

In the Claims

At Column 6, Line 47, "portion; and" should be -- portion; --.

Signed and Sealed this  
Ninth Day of April, 2024

Katherine Kelly Vidal  
*Director of the United States Patent and Trademark Office*